3,207,726
PREPARING TRIOXANE EPOXIDE COPOLYMERS
WITH TRIALKYLOXONIUM CATALYSTS
Fred Jaffe, Silver Spring, Md.
(7939 Glen Orchard Drive, Cincinnati, Ohio)
No Drawing. Filed June 16, 1960, Ser. No. 36,470
4 Claims. (Cl. 260—67)

This invention relates to a copolymer of trioxane with comonomers containing epoxide groups. In one specific embodiment it relates to a process for preparing a copolymer of trioxane and certain epoxides using certain stable trialkyloxonium salts as catalysts.

The polymerization of trioxane to form solid polymeric materials has been reported previously. Several years ago, Staudinger reported experiments in which formaldehyde was polymerized and a solid product recovered. The work described the bulk polymerization of gaseous formaldehyde in a process which entailed condensing anhydrous gaseous formaldehyde to a liquid and maintaining the liquid at temperatures of the order of −80° C. until polymerization was complete. A solid material was recovered from these experiments. Formaldehyde has been polymerized using the solution technique in a process in which monomeric formaldehyde was dissolved in an inert liquid which is a solvent for formaldehyde at a temperature in the lower part of its liquid range. The polymerization is effected by allowing the solution of formaldehyde in the solvent to warm to room temperature. The solution polymerization process may be carried out in the presence of a catalyst such as boron trifluoride or some other comparable catalytic material.

The polymers made according to this method were designated EU polyoxymethylene and were found to be unstable toward heat and were found to degrade at an undesirable rate at room temperature. Because of the instability of these materials they were never considered particularly suitable for making films, bristles, etc., or for other uses which a synthetic plastic material is normally used. Several years after Staudinger's work, the polymerization of formaldehyde to form stable polyoxymethylene compounds was worked out so that processes are known for making stable polymers of formaldehyde.

I have found that greatly superior polymers can be prepared by the copolymerization of trioxane and certain epoxides.

The superiority of the polymers of this invention is demonstrated by an evaluation of the "toughness" of the product formed and the thermal stability of the product formed. The compositions of this invention can be molded, spun or formed into articles by conventional methods without degradation or other evidences of instability.

The mechanism of this reaction is not fully understood although it is obvious that a copolymer of the epoxide and trioxane is formed.

The polymers of this invention are obtained by mixing freshly distilled trioxane with the epoxide, very dry purified propylene oxide, for example, under polymerization conditions and permitting the copolymers to form as rapidly as possible.

The polymers of my invention are defined as having a certain minimum degree of "toughness" or a certain minimum thermal stability. Degree of toughness is determined by subjecting a film from 3 to 8 mils in thickness of a series of manual creasing actions. A single crease cycle consists of folding the film through 180° and creasing and then folding in the reverse direction through 360° and creasing. The number of creasing cycles the film withstands before breaking is known as the degree of "toughness." Thus, a film that cannot stand one complete cycle has a degree of toughness of 0. If it breaks on the sixth cycle, for example, it has a degree of toughness of 5.

In the description of this invention, the property of thermal stability is defined by the value of the rate constant for thermal degradation at 222° C. The degradation reaction is assumed to be a first order reaction which can be expressed mathematically by the differential equation:

$$-\frac{DW}{DT}=KW$$

where

T is time from the beginning of decomposition,
W is the weight of the material remaining at time T,
K is the rate constant for the equation.

If a material had a thermal stability such that the value of K were greater than 1% per minute, the material would be considered too unstable to have any value as a polymer material. The value of this rate constant K for thermal degradation at 222° C. was determined using the syringe stability test. In this test, the number of ml. of gas evolved per gram of polymer for each five minutes of elapsed time at 222° C. is measured and the results converted to give a value of the rate constant K. The stability of the sample is determined by heating a sample of the polymer, weighed to the nearest milligram, to 222° C. in a hypodermic syringe and observing the position of the syringe cylinder at five minute intervals after the beginning of the test. A 50 ml. syringe is preferred for making the test. The syringe is cleaned and the polymer, in the form of a pressed pellet, is weighed and placed in the syringe. The syringe is lubricated between the piston and cylinder with a high quality inert oil or grease material. The syringe is evacuated and filled with nitrogen several times. Silicone oil is drawn into the syringe and ejected until about 5 ml. remains. The oil surrounding the polymer pellet serves as a means for expelling all gases before the test and as a heat transfer medium during the test. The nozzle of the syringe is then sealed and the syringe placed in a vapor bath at 222° C. The vapor bath may be vapors of methyl salicylate. The position of the syringe piston is noted at five minute intervals after the syringe is first placed in the vapor bath. The test may be continued for periods for 30 minutes or more and the position of the syringe piston over each five minute period determined. The change in position over the heating period determines the amount of gas evolved in the test and thus, the amount of polymer degraded to monomer.

The thermal degradation of the trioxane epoxide copolymers generally follows that predicted for a first order reaction. The data collected in the syringe stability test is converted to give the rate constant for thermal degradation K (222) using the equation:

$$K(222)=\frac{\text{volume of gas evolved in ml. in time T} \times 0.0736}{\text{time T in minutes} \times \text{initial weight of the polymer sample in grams}}$$

The factor 0.0736 is a constant calculated on the assumption that the gas evolved is monomeric formaldehyde and that it follows the gas law as an ideal gas. A K (222) value of 1 in reciprocal minutes is equivalent to 1% degradation per minute.

The trioxane epoxide copolymer of my invention is a novel composition of matter. My superior polymer can be prepared according to the following process: Freshly distilled trioxane is added to a tube and heated to a temperature of about 70° C. in a suitable bath. The epoxide, such as propylene oxide, for example, is added along with a suitable amount of a catalytic initiator. The reactants are maintained at an elevated temperature for a period of time sufficient for the reaction to go to completion and the solid polymers are recovered. Although the crude polymers are stable without treatment, their stability may be improved by treatment to remove the catalyst. The crude product is treated with a mildly basic product such as sodium carbonate, trimethylamine oxide etc. The treatment may be suitably carried out as follows: The crude polymer is dissolved in dimethyl formamide or some other suitable solvent, heated to about 145° C. and the basic material is added to the hot solution. The basic material is allowed to react with the polymer solution for a short period of time and the polymer is then precipitated by pouring the solution into cold alcohol. The precipitated polymer is removed by filtration and dried. Suitable products can be obtained by other types of treatment with the mildly basic material such as milling the material into the polymer, etc.

The quantity and thus, the percentage, of epoxide added in preparing my novel copolymer depends on the specific epoxide used. Thus, satisfactory results can be obtained by copolymerizing a mixture of about 0.5 to about 3% propylene oxide, for example, with about 99.5 to 97% trioxane. An excellent product is obtained by copolymerizing 99% trioxane with 1% propylene oxide. However, with epichlorohydrin, for example, a satisfactory product was obtained by polymerizing about 1 to about 8% epichlorohydrin with about 99 to about 92% trioxane. In general, satisfactory results are obtained when the epoxide is present as about 0.5 to 8% of the reaction mixture.

The polymerization requires certain catalytic initiators. Any of the stable trialkyl oxonium salts may be added as catalysts for the reaction. Examples of these salts include: Triethyloxonium fluoborate, triethyloxonium hexachloroantimonate, etc. The concentration of the catalyst is important. The use of excessive amounts of catalyst may result in an unstable initial product, possibly because the catalyst that catalyzes the polymerization also catalyzes degradation of the polymer. The amount of catalyst to be used varies with the comonomers being polymerized with the trioxane. When propylene oxide is the epoxide used, for example, the catalyst concentration must be kept within the range of about $10^{-6}$ to $10^{-3}$ moles of catalyst per mole of trioxane present in the reaction vessel, the preferred range being $10^{-6}$ to $10^{-4}$ moles of catalyst per mole of trioxane. In general, a satisfactory product is obtained when the initiator is present at concentrations of about $10^{-6}$ to $10^{-2}$ moles of catalyst per mole of trioxane.

It is convenient to carry out the reaction at a temperature between the melting point and boiling point of trioxane at atmospheric pressure. Thus, the propylene oxide reaction, for example, may be carried out at a temperature between 20 and 130° C. Best results are obtained at temperatures from 60 to 80° C. because, although propylene oxide, which boils at 35° C., is soluble in trioxane up to about 2% it would obviously tend to boil out of the solution at increased temperatures unless the reaction were run under pressure slightly above atmospheric. In general, a temperature of about 30 to 100° C. gives a satisfactory product.

Pressure is not critical, but for reasons of economy and ease of operation, I prefer to carry out the polymerization reactions at atmospheric or slightly above atmospheric pressure whenever possible. Obviously some advantage might be derived from operating at pressures below atmospheric if a gas phase reaction were anticipated or above atmospheric if volatile epoxides were to be reacted in a liquid phase. If the epoxide to be polymerized with the trioxane has a boiling point below the temperature of the reaction, the reaction would obviously be run under pressure. The minimum pressure will be determined by the temperature and the lowest boiling component. Thus, when the epoxide is higher boiling than the trioxane, the boiling point of the trioxane will determine the pressure. When the trioxane is the higher boiling component, the reverse is true.

The reaction may be run with or without solvents. Suitable solvents for the reaction include chlorinated hydrocarbons such as tetrachloroethane, dichloroethane, trichloroethane, etc., aliphatic hydrocarbons such as hexane, heptane, cyclohexane, etc., aromatic hydrocarbons such as chlorobenzene, nitrobenzene, etc. and other inert aprotic organic solvents.

The polymerization reaction is very rapid and is normally complete in about 5 to 40 minutes. However, the reaction may be run for periods from about 5 minutes to about 24 hours, the preferred time being about 20 minutes to about 2 hours. Various epoxides may be used in preparing the copolymers of my invention. Suitable epoxides include those falling within the general formula:

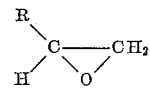

where R is hydrogen or an alkyl, aryl, aralkyl, alkaryl, or epoxy-cycloalkyl group. Substitutents may be present on the R group. Suitable substituents include halogen, nitro, cyano, carbalkoxy, or ether groups, etc.

The invention is further illustrated by the following illustrative but non-limiting examples.

*Example I*

A quantity of commercial trioxane was purified by refluxing under nitrogen over calcium hydride. The portion of the material distilled first was discarded and the center cut was stored under nitrogen for use in preparing the polymers of my invention.

A charge of 34.7 grams of this freshly distilled trioxane was transferred to a crown cap tube under nitrogen and was heated to 70° C in a thermostatically controlled bath. The propylene oxide, 0.42 ml. (0.35 grams), which had been previously purified was added. The catalyst, 0.5 ml., of a solution prepared by dissolving 0.99 grams of triethyloxonium fluoborate in tetrachloroethane and diluting to 100 ml., was added by means of a syringe. The polymer started to form within about 10 minutes after the addition of the catalyst. The run was continued for a period of 2 hours at 70° C. A yield of 34.5 grams of solid polymer was obtained which was extremely tough and hard. Several films were prepared from this solid in a hydraulic press at 350° F. and 10,000 p.s.i.g. pressure for a period of 3 minutes. The material had a degree of toughness of greater than 100. The rate constant for thermal degradation at 222° C. was found to be 0.75 weight percent per minute.

*Example II*

A total of 836 g. of trioxane was carefully purified using the technique described in detail in Example I and was added to a vessel under nitrogen. A charge of 8.36 g. of propylene oxide was added and the mixture heated to 70° C. at which time 8 ml. of the initiator solution, prepared by dissolving 1 g. of triethyloxonium fluoborate in tetrachloroethane and diluting to 100 ml. with tetrachloroethane, was added.

The polymer formation began within one minute. The reaction vessel was kept at 70° C. for an hour and the solid product isolated. A total of 810 g. of crude polymer was recovered. This polymer was pressed at 350° F. and 8,000 p.s.i. to give a flexible film that had a degree of toughness in excess of 100 and a rate constant for thermal degradation at 222° C. (K 222) of 0.95 to 1.05. The polymer was heated in a vacuum oven at 55° C. for 16 hours. A total of 798 g. or 95% yield of product was recovered. This crude polymer melted at 170 to 178° C. The film pressed from the polymer melted at 163 to 170° C.

*Example III*

A mixture of 265 g. of trioxane purified according to the method described in Example I was transferred to a reaction vessel under nitrogen and warmed to 70° C.

after 2.5 ml. of previously purified propylene oxide had been added. The polymerization was initiated with 2 ml. of initiator solution prepared in accordance with the method described in Example II. The reaction was allowed to continue for 2 hours after which the product was isolated. A total of 250 g. of solid material was obtained. A portion of the material was pressed and an opaque, tough film was recovered.

Obviously many modifications and variations of the invention as hereinabove set forth may be made without departing from the essence and scope thereof and only such limitations should be applied as are indicated in the appended claims.

What is claimed is:

1. A process for preparing a high molecular weight copolymer of trioxane and an epoxide having the general formula

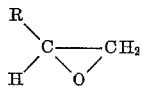

where R is selected from the group consisting of alkyl, aryl, aralkyl, alkaryl and epoxy cycloalkyl groups, which comprises the steps of heating about 92 to 99.5 parts of trioxane with about 8 to 0.5 parts of epoxide at a temperature of about 25–100° C. in the presence of about $10^{-2}$ to $10^{-6}$ moles of a trialkyloxonium catalyst selected from the group consisting of triethyloxonium fluoborate and triethyloxonium hexachloroantimonate for every mole of epoxide present for a period of about 5 minutes to 1 hour, recovering the polymer formed in the reaction, dissolving said polymer in a suitable solvent, treating the solution with a mildly basic material at an elevated temperature, reprecipitating the polymer and recovering the stable copolymer product.

2. A process according to claim 1 wherein the epoxide is propylene oxide.

3. A process according to claim 1 wherein the epoxide is propylene oxide and the catalyst is triethyloxonium fluoborate.

4. A process according to claim 1 wherein the epoxide is propylene oxide and the catalyst is triethyloxonium hexachloroantimonate.

References Cited by the Examiner

UNITED STATES PATENTS

| 2,394,910 | 2/46 | Gresham | 260—67 |
| 2,395,265 | 2/46 | Gresham | 260—67 |
| 2,457,224 | 12/48 | Gresham | 260—67 |
| 2,989,511 | 6/61 | Schnizer | 260—67 |
| 3,027,352 | 3/62 | Walling et al. | 260—67 |
| 3,112,280 | 11/63 | Farthing | 260—67 |

FOREIGN PATENTS

| 1,243,668 | 9/60 | France. |
| 1,221,148 | 1/60 | France. |
| 741,478 | 11/52 | Germany. |
| 878,163 | 9/61 | Great Britain. |

OTHER REFERENCES

Chemical Abstracts: The Naming and Indexing of Chemical Compounds, vol. 51, Subject Index Issue #1, Dec. 25, 1957, pp. 5924–5925, paragraph 299.

Latremouille et al.: Journal American Chemical Society, vol. 82, 120–124, Jan. 5, 1960.

Worsfold et al.: J.A.C.S., vol. 79, 897–902, Feb. 20, 1957.

Meerwein et al.: Ann. 566, 150–162, 1950.

WILLIAM H. SHORT, *Primary Examiner.*

MILTON STERMAN, HAROLD N. BURSTEIN, *Examiners.*